April 18, 1967  W. N. HADLEY  3,314,844
FABRIC SEAM BONDING
Filed May 1, 1963
2 Sheets-Sheet 1
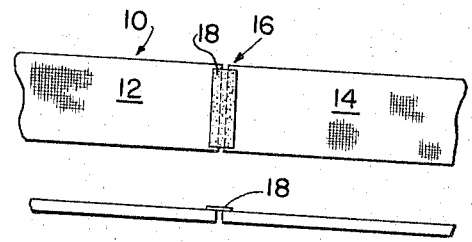
FIG. 1
FIG. 2
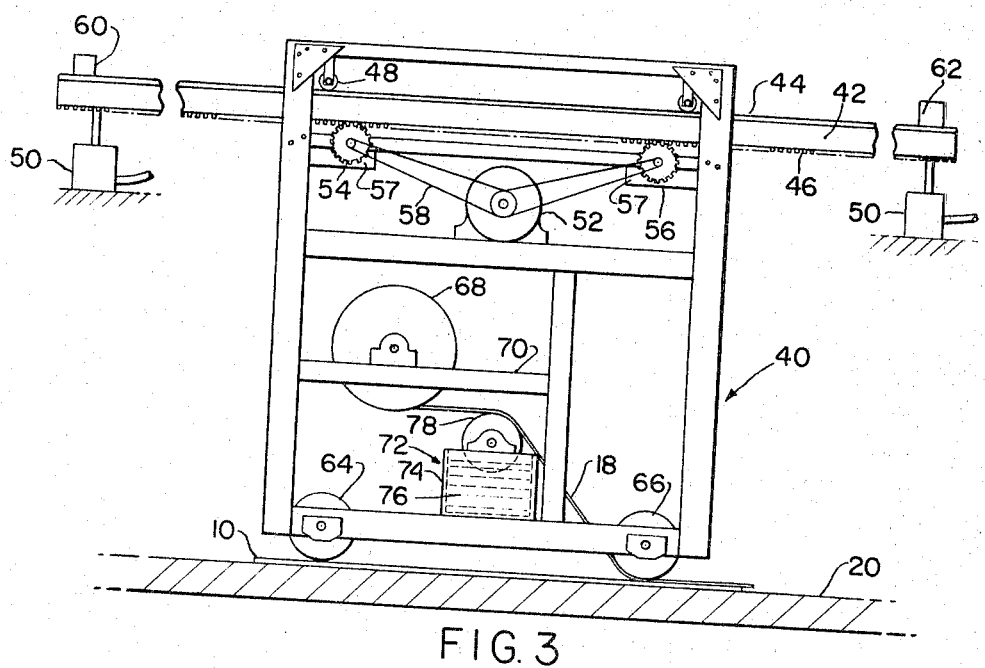
FIG. 3
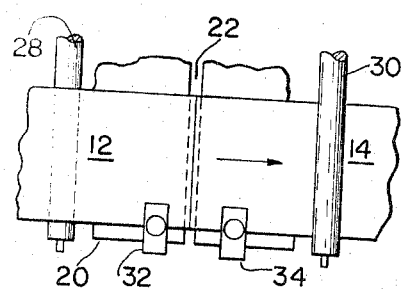
FIG. 4
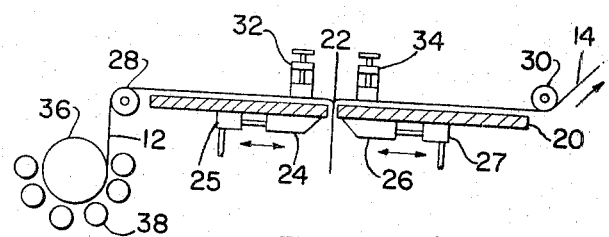
FIG. 5
INVENTOR.
WILFRED N. HADLEY
BY
*Morse & Altman*
ATTORNEYS April 18, 1967     W. N. HADLEY     3,314,844
FABRIC SEAM BONDING
Filed May 1, 1963     2 Sheets-Sheet 2
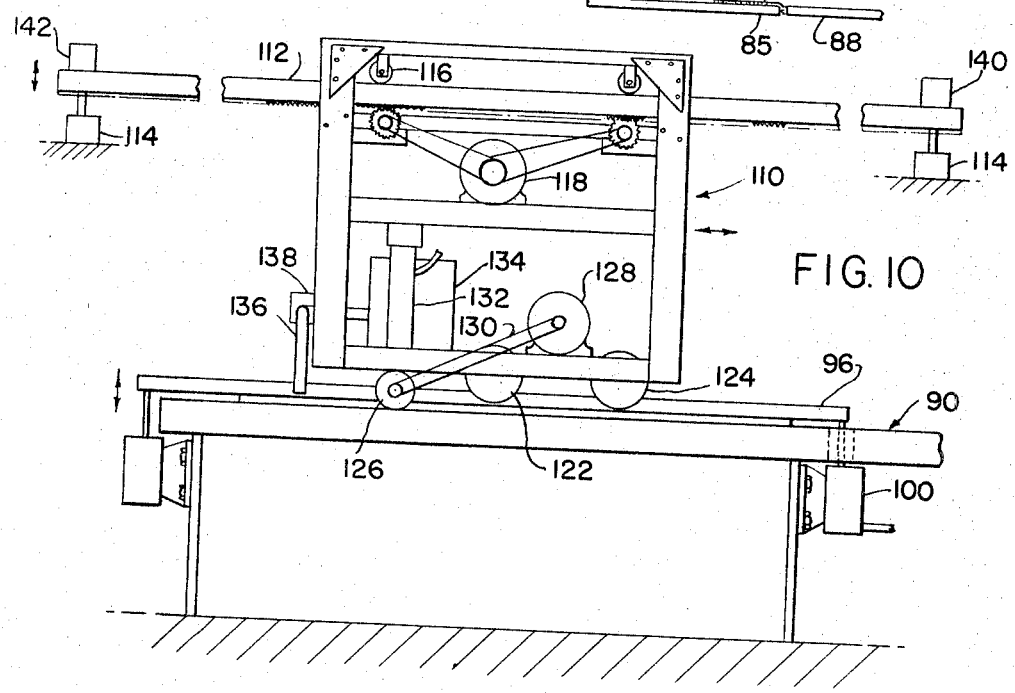
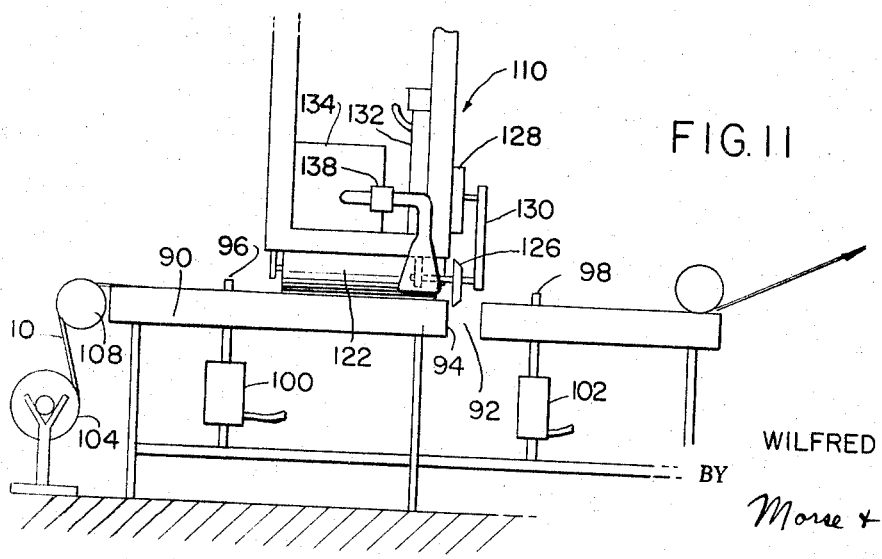
INVENTOR.
WILFRED N. HADLEY
BY
Morse & Altman
ATTORNEYS

United States Patent Office 3,314,844
Patented Apr. 18, 1967

3,314,844
FABRIC SEAM BONDING
Wilfred N. Hadley, Springfield, Vt., assignor to Hadley Company, Inc., Springfield, Vt., a corporation of Vermont
Filed May 1, 1963, Ser. No. 277,250
1 Claim. (Cl. 156—509)

This invention relates generally to the joining together of two or more pieces of textile material, and more particularly comprises an improved seam for joining the ends of two pieces of cloth to form a continuous feed of the cloth into fabric processing machines of various sorts. This invention is also directed towards a novel method and apparatus for forming the improved seams.

In the manufacture of various types of textile materials, it is the present practice to join the trailing end of one length of cloth to the leading end of another piece of cloth to make a continuous feed of the material through the various processing machines. Presently, adjoining lengths of cloth are connected by overlapping the opposing end edges and sewing them together with a transverse seam.

The increased thickness of the material caused by the transverse seam produces a number of problems which have been partially offset by the development of relatively complicated mechanisms. For example, when a length of material is passed through a shearing machine, it is necessary to lift the shearing blades above the surface of the cloth while the seam is passed thereunder. This involves detecting the seam before it reaches the blade and the use of responsive equipment for lifting the entire shearing assembly at the proper moment. Also, in decatizing, the thick seams frequently produce an off-print on cloth layers beneath or above the seam when wrapped in an apron around a steaming cylinder. These marks cannot be removed and create unnecessary remnants.

Furthermore, in most cases, this seam is maintained throughout all of the operations in the mill and passes through the processing of the bleachery and finishing plant. The equipment involved here includes calenders, dye jigs, padders, etc., all of which have expensive squeeze rolls that are damaged easily if the bulky seam is allowed to pass through. Automatic protection mechanism leaves portions of the material unfinished with resulting remnants or second quality merchandize created.

In any event, the joining of lengths of woven goods, has heretofore been unsatisfactory in view of the requirement for expensive machinery to protect both the seam and the machinery. In addition, the sewn seam results in a relatively high percentage of waste material with an accompanying loss of profits.

Accordingly, it is an object of the present invention to provide improvements in the joining of pieces of textile material.

Another object of this invention is to provide a seam for use in joining two or more pieces of textile material to form a continuous feed of material through various processing operations.

Yet another object of this invention is to provide a seam for use in joining pieces of textile material which seam does not substantially increase the thickness of the material.

Still another object of this invention is to provide a novel method for joining the ends of two pieces of sheet material.

A further object of this invention is to provide a novel apparatus for use in joining the ends of two pieces of sheet material.

More particularly, this invention features a seam for joining the ends of two or more pieces of sheet material which seam is of substantially the same thickness as the material being joined. In one embodiment of the invention, the pieces are joined by a thin flexible stratum overlaying the butted edges of the material and bonded thereto. In a modification of the invention, the ends are joined by bonding the warp threads of one piece to the marginal edge of the other piece or, alternatively, bonding the warp threads of both pieces together, the weft threads being omitted from the joining portions.

This invention also features a novel method and associated apparatus for automatically preparing the ends of the material which are to be joined and completing the bonding operation quickly and automatically without increasing the thickness of the material.

But these and other features of the invention, along with further objects and advantages thereof, will become more readily apparent from the following detailed description of the invention, with reference being made to the accompanying drawings in which FIGURE 1 is a top-plan view of two pieces of material joined by a seam in accordance with this invention, FIGURE 2 is a view in side elevation showing the seam of FIGURE 1, FIGURE 3 is a view in side elevation showing apparatus made according to this invention for producing the seam shown in FIGURES 1 and 2, FIGURE 4 is a fragmentary top-plan view of a table on which the seam is made, FIGURE 5 is a view in side elevation of the apparatus shown in FIGURE 4, FIGURES 6, 7, 8 and 9 are views similar to FIGURES 1 and 2 but showing two modifications of the invention, FIGURE 10 is a view similar to FIGURE 3 but showing a modified apparatus for producing the seams of FIGURES 6 to 9, and FIGURE 11 is a view in side elevation showing the apparatus of FIGURE 10.

Referring now to FIGURES 1 and 2 of the drawings, the reference character 10 generally indicates a web of woven material made up of two sections 12 and 14 joined at their ends by a seam 16. According to this invention the seam is formed by means of a thin ply of tape 18 bonded to the marginal edges of the connected ends. Preferably, the tape is an open mesh fabric of thin, flexible cotton or the like and overlies the opposing ends of the web sections 12 and 14 which are trimmed parallel to one another and joined in butting relation. The tape 18 is bonded over the butted edges by a suitable bonding medium such as a quick setting flexible cement.

The tape 18 has no significant thickness and is relatively thin in relation to the thickness of the web 10. The resulting seam therefore does not add to any appreciable extent to the thickness of the entire web. As a result, the web 10 may be run through the normal processing operations without taking the usual precautions to protect the machines and the web from the increased thickness formed by sewn seams employed heretofore.

Referring now more particularly to FIGURES 3, 4 and 5, there is illustrated an apparatus for use in automatically forming the seam shown in FIGURES 1 and 2. As shown, the apparatus includes a horizontally disposed table 20 over which is passed the web 10. As best shown in FIGURES 4 and 5, the table 20 is formed with a slot 22 extending perpendicularly to the length of the web 10 for at least the full width of the web. A pair of cutting elements 24 and 26 are mounted on the under side of the table 20 on opposite sides of the slot 22 and are adapted for power operation by means of pneumatic cylinders 25 and 27. The cutting elements are adapted to reciprocate from one another for reasons that will presently appear. The table 20 also is provided with a pair of idler rolls 28 and 30 located on either end thereof in a position transverse to the length of the web. Also associated with the table 20 are clamps 32 and 34 disposed on either side of the web and on opposite sides of the slot 22.

In practice, the trailing free end of the web section 14 is passed under the roll 30 and over the top of the table 20 as shown in FIGURE 5. The free end of the section 14 is dropped down into the slot 22 and the selvages secured to the table by means of the clamps 34. Similarly, the leading free end of the web section 12, which may be fed from a feed roll 36 supported by a dispensing cradle 38, is roven over the roller 28, and over the top of the table 20 with its free leading end dropped down into the opening 22 to be disposed opposite the free trailing end of the web section 14. The clamps 32 are then tightened to hold the web in fixed position to the table. With the web sections arranged in this manner, the cutting elements 24 and 26 are actuated to trim both ends of the web sections 12 and 14 simultaneously so that their ends will match evenly.

Once the ends of the web sections 12 and 14 have been trimmed, they are then butted against one another for joining. In FIGURE 3 there is illustrated an apparatus made according to the invention for applying a strip of tape 18 to the upper marginal surfaces of the two edges which are to be joined.

The apparatus is generally organized about a carriage 40 suspended from a pair of overhead racks 42 mounted horizontally above the table 20 and disposed in parallel spaced relation to the slot 22. Each rack is formed with a smooth upper surface 44 and a toothed lower surface 46. A set of rollers 48 are mounted on the upper portions of the carriage and bear against the smooth upper surface 44 of the racks 42 to support the carriage for movement along the racks. In practice, each end of the racks is supported by a lift mechanism which may be a pneumatic or hydraulic piston and cylinder, for example. The function of the lifting mechanism is to raise or lower the entire carriage for reasons that will presently appear.

Mounted centrally within the carriage 40 is a motor 52 which drives a pair of pinion gears 54 and 56 by means of belts 58. The pinion gears 54 and 56 are mounted rotatably to the carriage by means of bearing blocks 57 and are in mesh with the lower toothed surface of the racks 42. The motor 52 is reversible and it will be understood that the motor, in conjunction with the pinion gears 54 and 56, functions to move the carriage 40 back and forth along the racks 42 to traverse the full width of the web 10 disposed over the table 20. Limit switches 60 and 62 may be located at either end of the path of travel of the carriage to control the operation of motor 52.

Mounted on the lower portion of the carriage 40 are a pair of relatively wide rollers 64 and 66 which are adapted to bear against the web 10 when the carriage is in a lowered position, as shown in FIGURE 3. A feed roll 68 of tape 18 is rotatably mounted to a bracket assembly 70 forming part of the carriage 40. The tape is dispensed from the roll over an adhesive applicator 72 which includes a reservoir 74 for holding a quantity of liquid adhesive 76, and a rotatably mounted transfer roller 78. The tape 18 is roven over the top of the roller 78 and thence is carried down under the roller 66.

It will be understood that the seam is formed by butting together the free ends of the web sections 12 and 14 and then energizing the carriage motor 52. With the free end of the tape 18 held against one selvage of the web and the butted web ends underlying the rollers 64 and 66 of the carriage, the tape 18 will automatically be transferred to the butted ends of the web sections 12 and 14. Various types of adhesive materials may be employed, preferably a quick setting liquid or semi-liquid bonding solution should be employed which, when cured, is strong and flexible. If desired, the roll 66 which presses the tape on to the web, may be heated and a thermo setting bonding agent employed.

After the carriage has passed over the entire width of the web so that the tape 18 extends from one side of the web to the other over the joined ends, the tape will be cut, the carriage will be raised above the surface of the web by actuation of the lifting devices 50 and the entire carriage returned to a starting position in readiness for making the next seam.

It will be appreciated that a seam of this type has numerous advantages over the conventional sewn seam. For example, there is no need to lift shearing blades, press beds or calender rolls where the seam is level with the cloth thickness. In decatizing there is no off print of thick seams to cloth layers beneath or above when wrapped in an apron around a steaming cylinder. In addition, the seam made according to the present invention may be accomplished much more quickly and at a lower cost than can be a sewn seam.

Referring now more particularly to FIGURES 6, 7, 8 and 9, there are illustrated two modifications of seams embodying the invention. In FIGURES 6 and 7 the ends of two web sections 80 and 82 are joined by bonding together the warp threads only of the two web sections. The weft or filling threads are omitted from the end portions of either web section leaving just the warp threads. The warp threads from either end are intermeshed or overlain on one another and bonded together by means of a quick setting adhesive applied along the seam.

In FIGURES 8 and 9 one end 85 of a bonded seam 86 has both warp and filling threads while the other end 88 has only warp threads 89. In this case the warp threads of one piece are applied over the manginal end of the other piece which has a bonding agent applied thereto. The warp threads are then pressed on to the coated end of the web to bond the two sections together.

To obtain ends without filler threads and not pull the filling out, the weaver or loom attendant before cutting a piece out of the loom at a given length, merely pulls the warp forward for a few inches by hand advancing the cloth beam. Thereby he cuts the warp threads where there is no filling, and projecting threads are in readiness for either the seam of FIGURES 6 and 7 or 8 and 9.

Apparatus for forming seams of the sort shown in FIGURES 6 to 9 is illustrated in FIGURES 10 and 11. The apparatus includes a table 90 having a transverse slot 92, the left hand edge of which, as viewed in FIGURE 11, is provided with a sharpened steel strip 94. Clamping bars 96 and 98 are provided on either side of the slot 92 and extend the full width of the cloth 10. The clamping bars preferably are operated by pneumatic cylinders 100 and 102, which, when actuated, function to raise and lower the clamping bars.

As before, a feed roll 104 is mounted in a dispensing cradle 106 and the web 10 is fed over an idler roll 108 on to the upper surface of the table 90. The leading end of the web is dropped down into the slot 92 and the clamp 96 is applied to hold the cloth in position. Similarly, the trailing end of the preceding section of web is positioned on top of the table adjacent the slot 92 and the clamp 98 may be employed to hold this section of web in position.

With the web sections in the positions described, the ends are ready for joining. This is carried out by means of a carriage 110 which is adapted to transverse back and forth across the width of the web. The carriage 110 is similar in many respects to the carriage shown in FIGURE 3. As shown, the carriage is supported from a pair of horizontal parallel racks 112 similar to the racks 42 of the principal embodiment. Both ends of the racks are mounted to pneumatic jacking devices 114 for raising and lowering the rack and carriage assembly. Rollers 116 are connected to the upper portions of the carriage and ride along the top surface of the racks 112 as in the principal embodiment. Similarly, a motor 118 is employed to drive a pair of spaced pinions for moving the carriage along the racks.

The lower portion of the carriage includes a pair of relatively wide pressing rollers 122 and 124 which are adapted to ride along the top surface of the web 10. Mounted also on the lower portion of the carriage is a cutting wheel 126 which, when in operative position, is adapted to move along the hardened steel strip 94 to shear the ends of the warp threads or the web end depending upon which type of bonded seam is to be made. In any event the cutting wheel moves along the strip 94 with the carriage as it traverses the table and web. A motor 128 is mounted on the carriage and rotates the cutting wheel 126 by means of a belt 130. The cutting wheel itself is arranged to reciprocate vertically into and out of engagement with the cutting strip 94 by means of a solenoid-operated penumatic cylinder 132.

Also mounted on the carriage 110 is an adhesive spraying device comprising a pressurized tank 134 and a spray nozzle 136 having a flared end portion extending out over the left hand side of the carriage as viewed in FIGURE 10 into a position over the bonding area. A solenoid-actuated valve 138 is employed to control the discharge from the tank 134.

In practice, the operator locates the free end of the web section in the slot 92, and energizes both the drive motor 118 and the trimming motor 128. The entire carriage 110 then moves from left to right as viewed in FIGURE 10, with the rollers 122 and 124 pressing down on the edge of the web. The cutting wheel 126 follows the rollers and trims off the loose ends of the warp threads or the whole cloth depending on which type of bond is to be made. Following the cutting wheel is the spray nozzle 136 which sprays an even coating of adhesive along the margin of the web which has been cut. The spray is started by actuating the solenoid valve 138 as the nozzle moves over the web. Once the carriage has fully traversed the width of the web it contacts a limit switch 140 which stops motor 128, the trimming motor 128 and also the solenoid-actuating cylinder 132 and the solenoid-actuated valve 138, thereby retracting the cutter wheel 126 and closing the spray nozzle. The operator then overlies the trailing edge of the preceding section on to the adhesive coated margin of the web section that has just been trimmed and sprayed. The carriage then reverses itself with the cutting wheel retracted and the spray nozzle closed so that the rollers 122 and 124 press down against the overlay to bond the two pieces intimately together. A second limit switch 142 is employed at the end of the path of travel of the carriage to de-energize the motor 148 and thereby stop the carriage and release the air pistons holding the clamp bars 96 and 98.

In addition to the control devices illustrated several other useful controls may be employed. For example, means may be provided for automatically stopping the feed of the web as the roll in the unrolling cradle comes to an end. This may be done by means of a photocell with its beam directed across the path of travel of the web and located on the feeding side of the seaming mechanism. An alternative arrangement could involve a minimum weight control for the rollers supporting the feed roll.

It will be appreciated that the bonded seams illustrated and described herein have numerous advantages over the sewn type of seam used to join separate pieces of web material. By dispensing with thread sewing, the cost of making the seam is materially reduced and the various processing operations are accelerated so that the material may be range fed into high speed brushing and shearing machines which operate at speeds up to 240 yards per minute. Since the overall thickness of the web remains substantially the same as that in a single strand of fabric, the entire length of each piece may be shorn with no automatic seam passing and unshorn portions that have to be hand trimmed, and the expensive seam detecting and seam passing mechanism is completely avoided, thereby speeding operation while greatly reducing the cost of the machinery. In addition, the seams may be made much faster than can a conventional sewn type seam. Also the cost of the bonding mechanism is considerably lower than that of the sewing machine required for a conventional sewn seam.

While the invention has been described with particular reference to the illustrated embodiments, it will be understood that numerous modifications thereto will appear to those skilled in the art. Also, it will be understood that the above description and the accompanying drawings should be taken as illustrative of the invention and not in a limiting sense.

Having thus described the invention, what I claim and desire to obtain by Letters Patent of the United States is:

Apparatus for bonding together the free ends of two separate sections of web material, comprising a generally horizontally disposed table adapted to support the leading end of one web section and the trailing end of another web section in end to end alignment, said table being formed with an opening extending in a direction generally transverse to the length of said web material, said opening being sufficiently deep to receive the leading end of said one web section, a hardened strip fixed to said table along the edge of said opening over which is placed said leading end of said one web section, a power operated carriage mounted above said table adapted to reciprocate in a horizontal plane along said edge and in a direction transverse to the length of said web, cutting means mounted on said carriage for trimming the leading end of said one web section along a line generally transverse to the length of said web, dispensing means mounted on said carriage for depositing an adhesive stratum along the marginal edge of the trimmed leading edge of said one web section, roller means mounted on said carriage adapted for pressing together the leading and trailing ends of said web sections after they have been overlapped and after application of said adhesive stratum, and power jacking means engaging said carriage for raising and lowering said carriage into and out of operative engagement with said table.

References Cited by the Examiner
UNITED STATES PATENTS

| | | | |
|---|---|---|---|
| 1,261,118 | 4/1918 | Geisel | 156—157 X |
| 2,412,693 | 12/1946 | Pierson | 156—57 |
| 2,606,136 | 8/1952 | Garrett et al. | 156—504 |
| 3,134,693 | 5/1964 | Curran | 118—4 |

EARL M. BERGERT, *Primary Examiner.*

P. R. WYLIE, W. HOAG, *Assistant Examiners.*